(12) United States Patent
Inaba (10) Patent No.: US 8,867,936 B2
(45) Date of Patent: Oct. 21, 2014

(54) IMAGE FORMING APPARATUS, METHOD OF CONTROLLING THE SAME, AND PROGRAM

(71) Applicant: Canon Kabushiki Kaisha, Tokyo (JP)

(72) Inventor: Keishi Inaba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 13/762,603

(22) Filed: Feb. 8, 2013

(65) Prior Publication Data

US 2013/0148151 A1    Jun. 13, 2013

Related U.S. Application Data

(63) Continuation of application No. 12/814,105, filed on Jun. 11, 2010, now Pat. No. 8,396,387.

(30) Foreign Application Priority Data

Jun. 30, 2009   (JP) .................................. 2009-156327

(51) Int. Cl.
  *G03G 15/00*   (2006.01)
  *G03G 15/20*   (2006.01)
  *H04N 1/00*    (2006.01)

(52) U.S. Cl.
  CPC .... *H04N 1/00896* (2013.01); *H04N 2201/0098* (2013.01); *G03G 15/5004* (2013.01); *H04N 1/00885* (2013.01); *H04N 2201/0094* (2013.01)
  USPC .................................. 399/43; 399/69; 399/88

(58) Field of Classification Search
  USPC ..................................... 399/43, 69, 70, 75, 88
  See application file for complete search history.

(56) References Cited

U.S. PATENT DOCUMENTS

2006/0291884 A1    12/2006  Okamoto et al.
2008/0118261 A1 *   5/2008  Kotani ............................ 399/69

FOREIGN PATENT DOCUMENTS

JP           2005-107287 A      4/2005
JP           2008-271118 A     11/2008

* cited by examiner

*Primary Examiner* — Joseph S Wong
(74) *Attorney, Agent, or Firm* — Fitzpatrick, Cella, Harper & Scinto

(57) ABSTRACT

This invention provides an image forming apparatus which performs sleep control for a shift to the sleep mode for each function and provides a user-friendly operation system, and a method of controlling the same. To accomplish this, the image forming apparatus sets a shift time until a power state of the image forming apparatus shifts to the low-power state after execution of image formation; and performs control to shift the power state of the image forming apparatus to the low-power state, when the shift time is not more than the predetermined time, before an elapse of the shift time after execution of image formation by the printing function, while shifting the power state of the image forming apparatus to the low-power state, in response to an elapse of the shift time after execution of image formation by the copying function.

6 Claims, 9 Drawing Sheets

IMAGE FORMING APPARATUS, METHOD OF CONTROLLING THE SAME, AND PROGRAM

This application is a continuation of U.S. patent application Ser. No. 12/814,105, filed Jun. 11, 2010, which is now allowed.

BACKGROUND OF THE INVENTION

1. Field of the Invention

The present invention relates to an image forming apparatus which includes a copying function and a printing function and performs power saving control, a method of controlling the same, and a program.

2. Description of the Related Art

An image forming apparatus including a copying function and a printing function consumes the maximum power at the time of operation. The image forming apparatus keeps consuming power for a while after the end of operation, and shifts to the sleep mode when no operation is performed for a predetermined period of time or more. Japanese Patent Laid-Open No. 2005-107287 has proposed an image forming apparatus which allows to make time setting, for each of functions including the copying function and the printing function, in such a manner that when a predetermined time or more has elapsed without any operation, the apparatus shifts to the sleep mode. This makes it possible to perform fine power saving control in an image forming apparatus. That is, the image forming apparatus disclosed in Japanese Patent Laid-Open No. 2005-107287 allows to set, for each of functions including the copying function and the printing function, a time until a shift to the sleep mode.

According to the above conventional technique, however, the operator needs to set, for each of functions including the copying function and the printing function, a time until a shift to the sleep mode. That is, the operator needs to perform cumbersome operation. On the other hand, setting a single time until a shift to the sleep mode will make it impossible to perform fine sleep control for a shift to the sleep mode for each of functions including the copying function and the printing function. In this case, it is not always possible to perform desired sleep control for each function in implementing power saving in the image forming apparatus.

SUMMARY OF THE INVENTION

The present invention enables realization of an image forming apparatus which performs sleep control for a shift to the sleep mode for each function and provides a user-friendly operation system, a method of controlling the same, and a program.

One aspect of the present invention provides an image forming apparatus which operates in one of a plurality of power states including a low-power state, comprising: a reception unit that receives image data transmitted from an external device; an acquisition unit that acquires image data by reading a document; an image forming unit that executes a printing function of forming an image based on image data received by the reception unit or a copying function of forming an image based on image data acquired from the acquisition unit; a setting unit that sets a shift time until a power state of the image forming apparatus shifts to the low-power state after execution of image formation by the image forming unit; and a control unit that performs control to shift the power state of the image forming apparatus to the low-power state, when the shift time set by the setting unit is longer than a predetermined time, in response to an elapse of the shift time after execution of image formation by the printing function or the copying function, and to shift the power state of the image forming apparatus to the low-power state, when the shift time set by the setting unit is not more than the predetermined time, before an elapse of the shift time after execution of image formation by the printing function, while shifting the power state of the image forming apparatus to the low-power state, in response to an elapse of the shift time after execution of image formation by the copying function.

Another aspect of the present invention provides a method of controlling an image forming apparatus which operates in one of a plurality of power states including a low-power state, comprising: receiving image data transmitted from an external device; acquiring a document to acquire image data; executing a printing function of forming an image based on received image data; executing a copying function of forming an image based on the acquired image data; setting a shift time until a power state of the image forming apparatus shifts to the low-power state after execution of image formation in the executing a printing function or the executing a copying function; and performing control to shift the power state of the image forming apparatus to the low-power state, when the set shift time is longer than a predetermined time, in response to an elapse of the shift time after execution of image formation in the executing a printing function or the executing a copying function, and to shift the power state of the image forming apparatus to the low-power state, when the set shift time is not more than the predetermined time, before an elapse of the shift time after execution of image formation in the executing a printing function, while shifting the power state of the image forming apparatus to the low-power state, in response to an elapse of the shift time after execution of image formation in the executing a copying function.

Still another aspect of the present invention provides a computer-readable storage medium storing a computer program for causing a computer to execute the method of controlling the image forming apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<Arrangement of Image Forming Apparatus>

The first embodiment of the present invention will be described below with reference to FIGS. 1 to 8. The hardware arrangement of an image forming apparatus 100 according to this embodiment will be described first with reference to FIG. 1. Blocks important in implementing the present invention will be mainly described below. Therefore, the image forming apparatus according to the present invention may be implemented by adding other blocks to the arrangement in FIG. 1.

Figure 1:
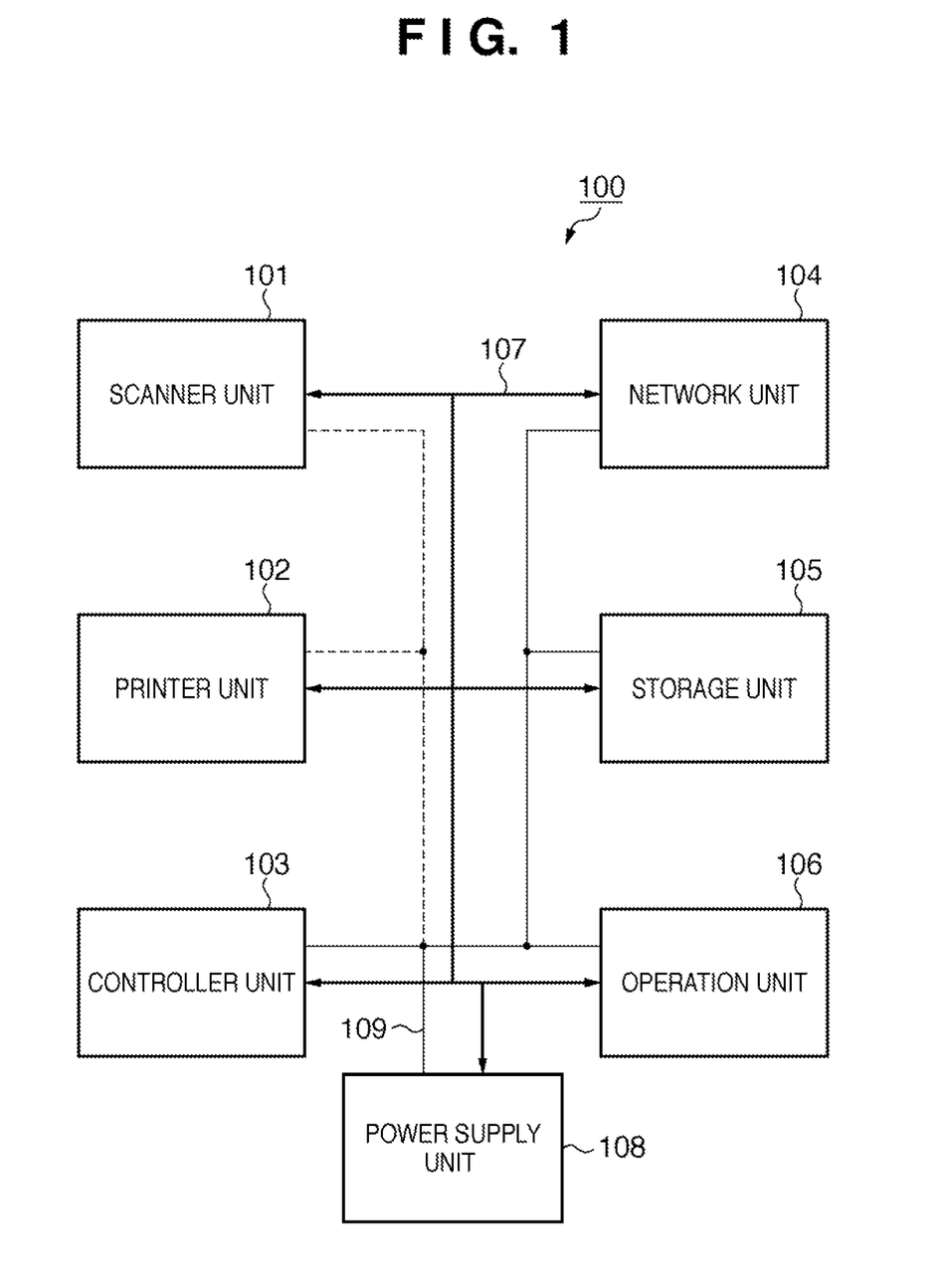
FIG. 1 is a block diagram showing an example of the arrangement of an image forming apparatus 100 according to the first embodiment.

The image forming apparatus 100 includes, as a plurality of loads, a scanner unit 101, a printer unit 102, a controller unit 103, a network unit 104, a storage unit 105, an operation unit 106, and a power supply unit 108. A bus 107 is a system bus via which control signals from the controller unit 103 and data signals between the respective blocks are transmitted and received. A power line 109 is a line through which power is supplied to each block. In the sleep mode for reducing the power consumption of the apparatus, the image forming apparatus 100 stops supplying power to, for example, the scanner unit 101 and the printer unit 102 as indicated by the power line 109 indicated by the dotted line. In this case, in the sleep mode, the power supply unit 108 may stop supplying power to both the scanner unit 101 and the printer unit 102 or may stop supplying power to the printer unit 102 without stopping supplying power to the scanner unit 101.

The scanner unit 101 reads a document and outputs the read image as image data. The printer unit 102 prints an image on a printing material in accordance with image data. The controller unit 103 performs data processing such as processing for image data read by the scanner unit 101 and data to be printed by the printer unit 102, and systematically controls the image forming apparatus 100. The network unit 104 controls transmission/reception of data to/from external apparatuses such as client PCs. The storage unit 105 includes a hard disk drive, and is used for the storage of various data such as image data read by the scanner unit 101 and print data.

Figure 2:
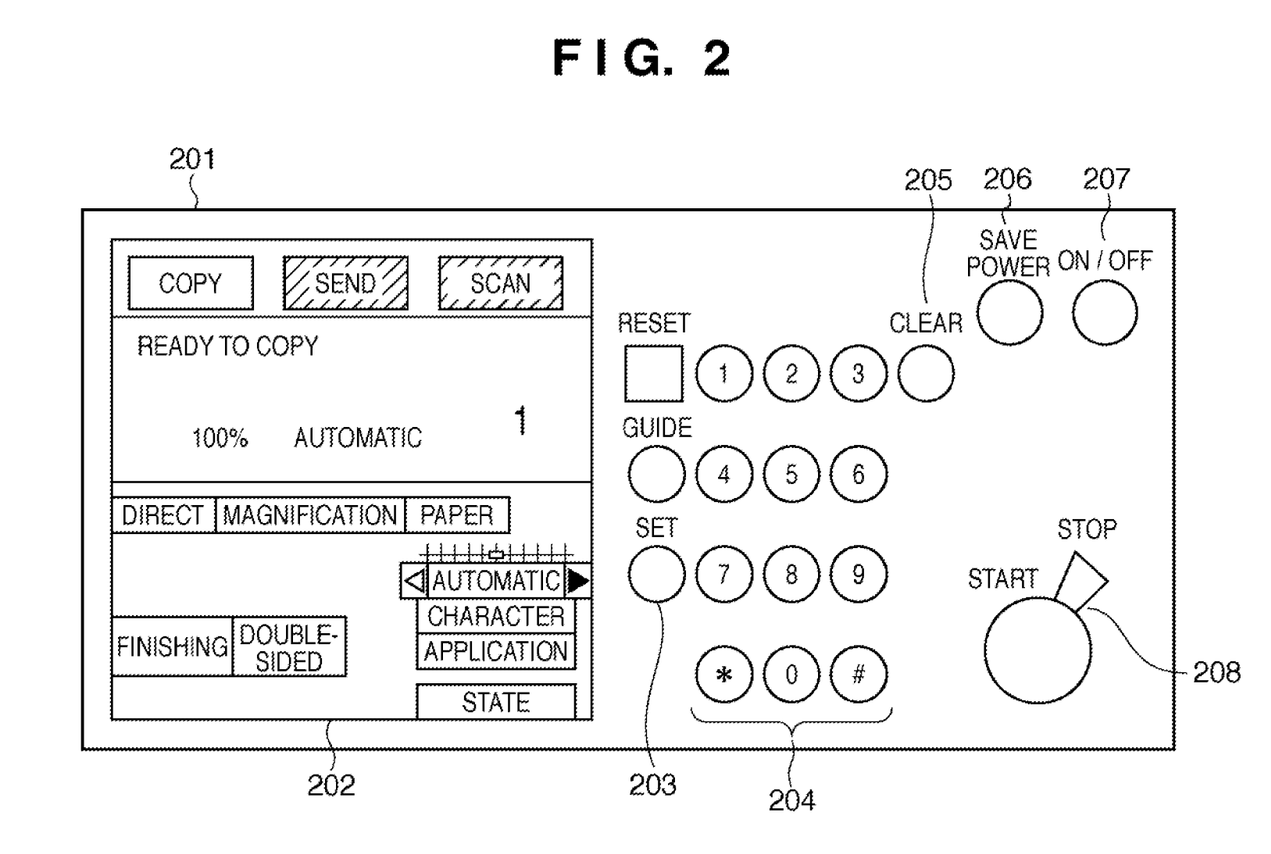
FIG. 2 is a view showing an example of an operation panel 201 according to the first embodiment.

The operation unit 106 controls an operation panel 201 shown in FIG. 2, and controls display of various pieces of information and acceptance of instruction inputs from the operator. The power supply unit 108 functions as a power saving unit, and controls power supply to each block. For example, the power supply unit 108 changes power supply destinations in the sleep mode and the normal mode. In this case, the sleep mode is a mode of supplying power to only some blocks (loads). The apparatus shifts to this mode when no operation is performed before the lapse of a predetermined period of time. This embodiment performs sleep control for a shift to the sleep mode for each of the functions which the image forming apparatus 100 has, e.g., the copying function and the printing function. The normal mode is, for example, a mode of supplying power to all the blocks shown in FIG. 2.

<Operation Panel>

The operation panel 201 of the image forming apparatus 100 will be described next with reference to FIG. 2. The operation unit 106 controls the operation panel 201. The operation panel 201 displays various kinds of information of the image forming apparatus 100 and receives instruction inputs from the operator. A display unit 202 displays functions and messages to the operator. The display unit 202 is a liquid crystal touch panel. The operator can perform selection by pressing a soft key displayed on the panel. Referring to FIG. 2, for example, the copying function is displayed.

A setting key 203 is a key for making setting for the image forming apparatus. A ten-key pad 204 includes keys to be used to input numerical values and the like. A clear key 205 is a key for returning an input to a default value when, for example, the ten-key pad 204 is erroneously set. A power saving key 206 is a key for suppressing the power consumption of the operation unit 106. Pressing the power saving key 206 will cut off power to the operation unit 106. In order to restore the operation unit 106, the operator presses the power saving key 206 again. This makes it possible to control the operation unit 106.

A power key 207 is a key for suppressing the power consumption of the image forming apparatus 100. Pressing this key will control the disconnection of power in the apparatus and make the image forming apparatus 100 shift to the sleep mode. Pressing the power key 207 again allows the image forming apparatus 100 to perform restoration processing from the sleep mode and perform control. A start/stop key 208 is a key for starting/stopping the execution of a function. In the case of the copying function, for example, pressing the start key will make the apparatus start reading a document. When the operator wants to stop operation, he/she presses the stop key. This stops the operation.

<Sleep Control Including Standby State>

Figure 3:
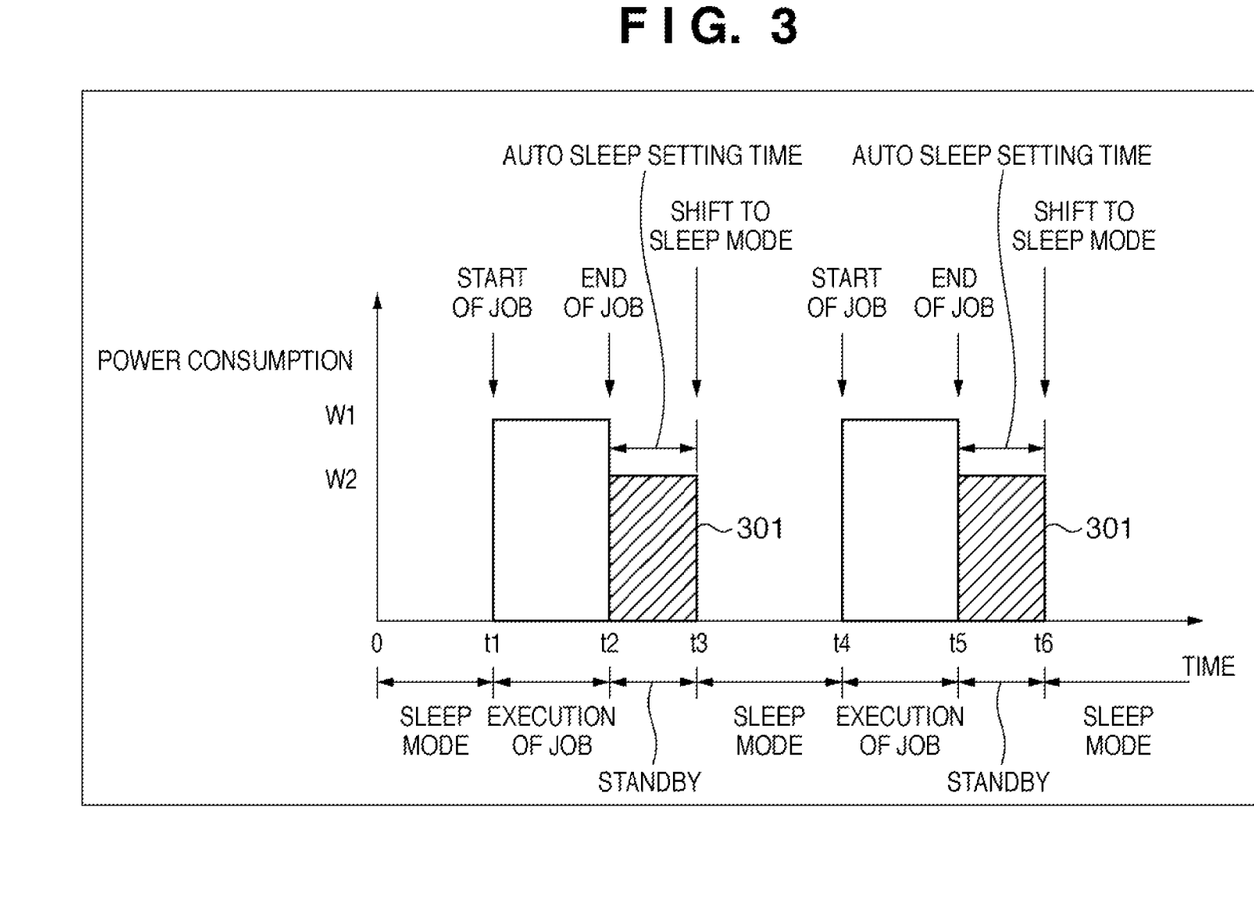
FIG. 3 is a view for explaining sleep control including a standby state according to the first embodiment.

Sleep control including a standby state will be described next with reference to FIG. 3. FIG. 3 shows the relationship between power consumption and time. The ordinate represents the power consumption, and the abscissa represents the time. Reference symbols W1 and W2 denote arbitrary power consumptions; and t1 to t6, arbitrary times.

The image forming apparatus 100 starts a job at time t1. The apparatus consumes the power W1 until the end of the job at time t2. The image forming apparatus 100 then shifts to the standby state to consume the power W2 lower than the power at the time of operation. In this case, the auto sleep mode is set in the image forming apparatus 100, and hence the apparatus shifts to the sleep state with low power at time t3 after the lapse of a set time since time t2.

When the next job is designated, the image forming apparatus 100 starts the job at time t4. The apparatus consumes the power W1 until the end of the job at time t5. The image forming apparatus 100 then shifts to the standby state, and consumes the power W2 lower than the power at the time of operation. As described above, the image forming apparatus 100 then shifts to the sleep state with low power at time t6 after the lapse of an auto sleep setting time since time t5. When using sleep control including the standby state, the image forming apparatus 100 controls power consumption in this cycle.

<Sleep Control Including No Standby State>

Figure 4:
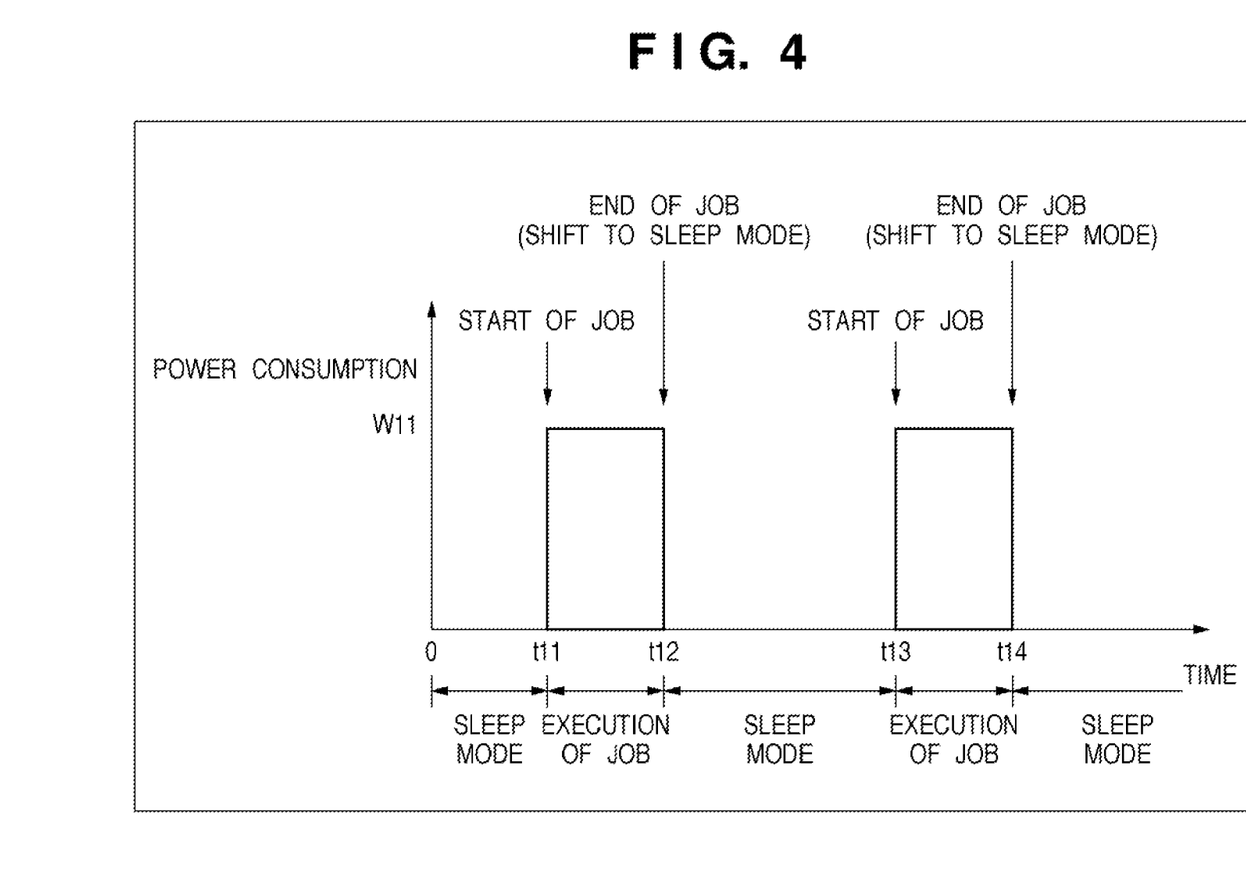
FIG. 4 is a view for explaining sleep control including no standby state according to the first embodiment.

Sleep control including no standby state will be described next with reference to FIG. 4. FIG. 4 shows the relationship between power consumption and time. The ordinate represents the power consumption, and the abscissa represents the time. Reference symbol W11 denotes an arbitrary power consumption; and t11 to t14, arbitrary times.

The image forming apparatus 100 starts a job at time t11. The apparatus consumes the power w11 until the end of the job at time t12. Thereafter, in the case of sleep control including the standby state shown in FIG. 3, the apparatus shifts to the standby state. In sleep control including no standby state, the apparatus shifts to the sleep state with lower power from time t12 at the same time when the job is complete. In sleep control, the image forming apparatus 100 can save the power consumption (corresponding to a hatched portion 301 shown in FIG. 3) in the standby state after the end of the job.

When the next job is designated, the image forming apparatus 100 starts the job at time t13. The apparatus consumes the power W11 until the end of the job at time t14. Thereafter, the image forming apparatus 100 shifts to the sleep state with lower power from time t14 at the same time when the job is complete. When using sleep control including no standby state, the image forming apparatus 100 controls power consumption in this cycle.

This embodiment suitably applies the above sleep control including the standby state and the above sleep control including no standby state to each function. More specifically, the image forming apparatus 100 uses a setting time as a shift time to the sleep mode (to be referred to as an auto sleep shift time hereinafter) to determine a proper auto sleep shift time for each function. Specific control in sleep control at the time of printing operation (printing function: second function) and sleep control at the time of copying operation (copying function: first function) will be described below.

<Sleep Control at Time of Printing Operation>

Figure 7:
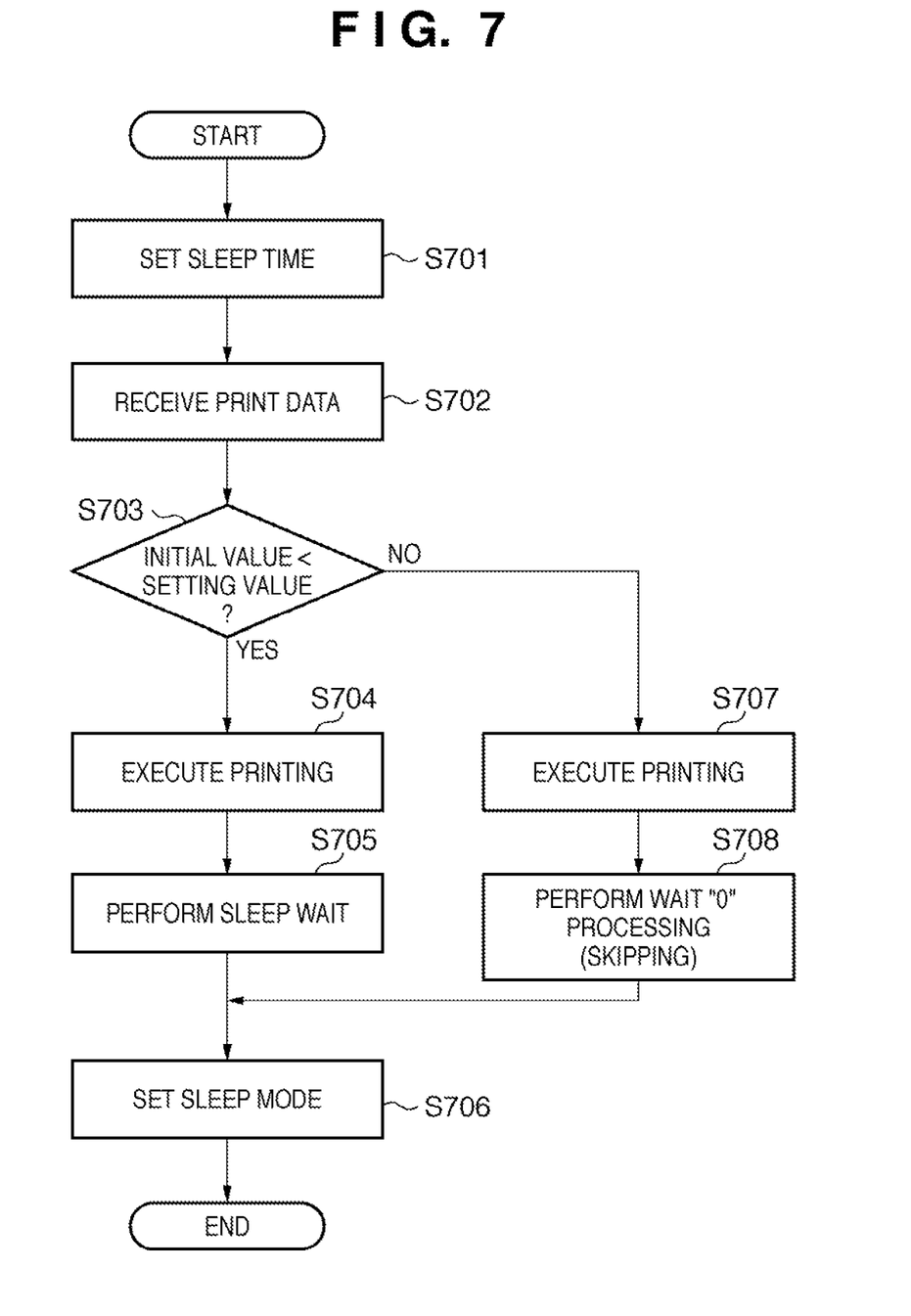
FIG. 7 is a flowchart showing a processing procedure for sleep control at the time of printing operation in the image forming apparatus 100 according to the first embodiment.

A processing procedure for sleep control at the time of printing operation in the image forming apparatus 100 will be described next with reference to FIG. 7. The controller unit 103 performs the processing to be described below by reading out and executing programs and the like stored in the storage unit 105. Note that each number following S indicates a step number in each flowchart.

First of all, in step S701, the controller unit 103 sets a sleep time for the image forming apparatus 100. More specifically, when the operator presses the setting key 203 shown in FIG. 2, the controller unit 103 displays a setting menu (not shown) on the display unit 202. When the operator selects the setting of an auto sleep shift time shown in FIG. 6 in the setting menu, the controller unit 103 displays an auto sleep shift time setting window 600 shown in FIG. 6 on the display unit 202.

Figure 6:
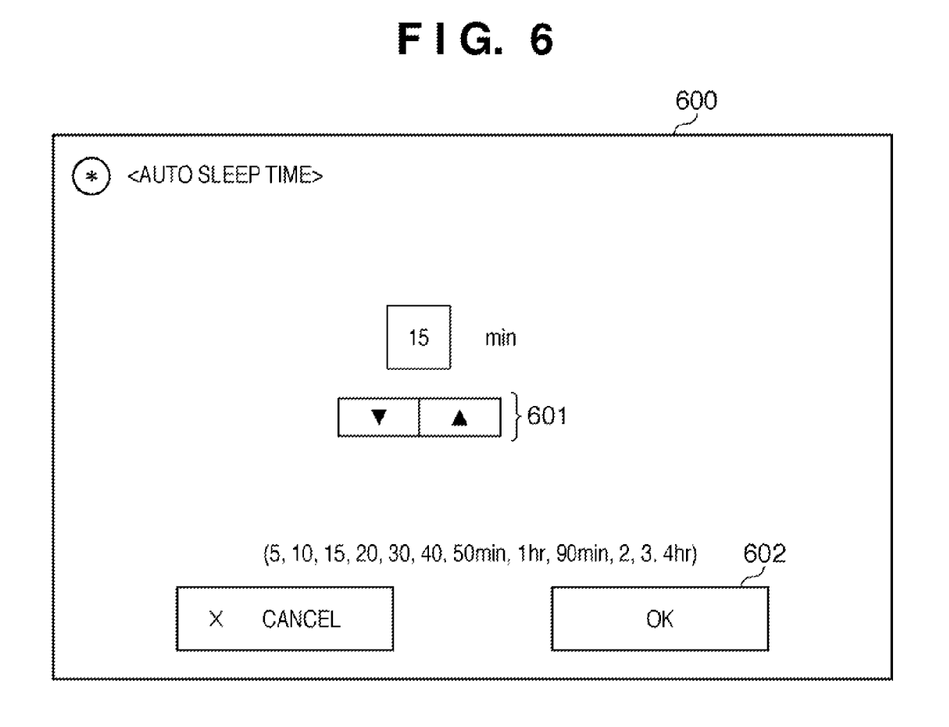
FIG. 6 is a view showing an example of a setting screen 600 displayed on a display unit 202 according to the first embodiment.

For example, the default setting time (initial value) of an auto sleep shift time after power-on operation is 15 min as shown in FIG. 6. As described with reference to FIG. 3, FIG. 6 shows a case in which the apparatus shifts to the sleep state with low power after the lapse of 15 min since the end of a job. When changing the auto sleep shift time, the operator decreases or increases the current setting time by operating a setting time increase/decrease key 601 on the setting window 600. This operation makes it possible to change the setting time. When the operator presses an OK button 602 afterward, the apparatus changes the auto sleep shift time setting.

In step S702, the controller unit 103 receives print data transmitted from a PC connected to the image forming apparatus 100 via a LAN or the like to the image forming apparatus 100. In step S703, the controller unit 103 determines whether the current setting time as an auto sleep shift time exceeds the initial value. If the current setting time exceeds the initial value, the process advances to step S704. If the current setting time is equal to or less than the initial value, the process advances to step S707.

If the current setting time as an auto sleep shift time is equal to or less than the initial value, the controller unit 103 executes printing processing in step S707. When the printing processing is complete, the controller unit 103 performs control in sleep mode shift processing to shift to the sleep mode immediately after the end of the job, if the setting time is equal to or less than the 15 min. In step S708, the controller unit 103 performs wait "0" processing (skipping) after the end of the printing processing. In step S706, the controller unit 103 performs control for a shift to the sleep mode. That is, since no shift time is set, the apparatus shifts to the sleep mode immediately after (0 min after) the execution of the printing processing in step S707.

If the current setting time as an auto sleep shift time exceeds the initial value, the controller unit 103 executes printing processing in step S704. In this case, for example, in step S701, the operator has performed operation to increase the current setting time by operating the setting time increase/decrease key 601 on the setting window 600 and has set the initial value to 15 min to 20 min. When printing processing is complete, the controller unit 103 performs 20-min wait processing in step S705 since the auto sleep shift time is set to 20 min. More specifically, the controller unit 103 counts 20 min, which is the auto sleep shift time, by using a timer. When 20 min have passed, the controller unit 103 advances to step S706 to perform control to shift the image forming apparatus 100 to the sleep mode.

<Sleep Control at Time of Copying Operation>

Figure 8:
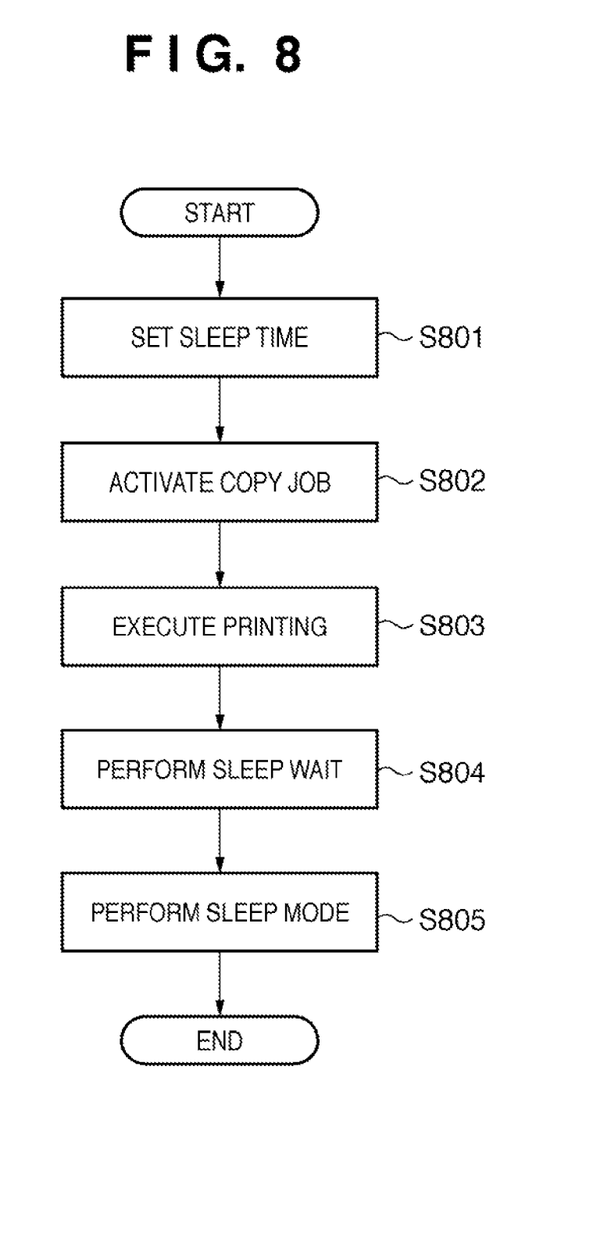
FIG. 8 is a flowchart showing a processing procedure for sleep control at the time of printing operation in the image forming apparatus 100 according to the first embodiment.

A processing procedure for sleep control at the time of copying operation in the image forming apparatus 100 will be described next with reference to FIG. 8. The controller unit 103 performs the processing to be described below by reading out and executing programs stored in the storage unit 105.

First of all, in step S801, the controller unit 103 sets a sleep time in the image forming apparatus 100. More specifically, since the setting method is the same as that described in association with step S701, a description of the method will be omitted. Subsequently, in step S802, the controller unit 103 activates a copy job. When, for example, the operator presses the start/stop key 208 after a document is placed on the document table, the controller unit 103 starts copying operation. When the operation starts, the image forming apparatus 100 reads the document via the scanner unit 101, processes the image data via the controller unit 103, and outputs the resultant data to the printer unit 102. In step S803, the controller unit 103 then executes printing processing for the image data by using the printer unit 102.

When the printing processing in copying operation is complete, the controller unit 103 enters the standby mode and performs wait processing for a time corresponding to a shift to the sleep mode in step S804. If, for example, 15 min is set as an auto sleep shift time, the controller unit 103 counts 15 min as a sleep shift time after the end of the printing processing. When 15 min has passed, the process advances to step S805, in which the controller unit 103 performs control for shifting the image forming apparatus 100 to the sleep mode. As described above, at the time of copying operation, the setting time is used as an auto sleep shift time without any change.

Figure 5:
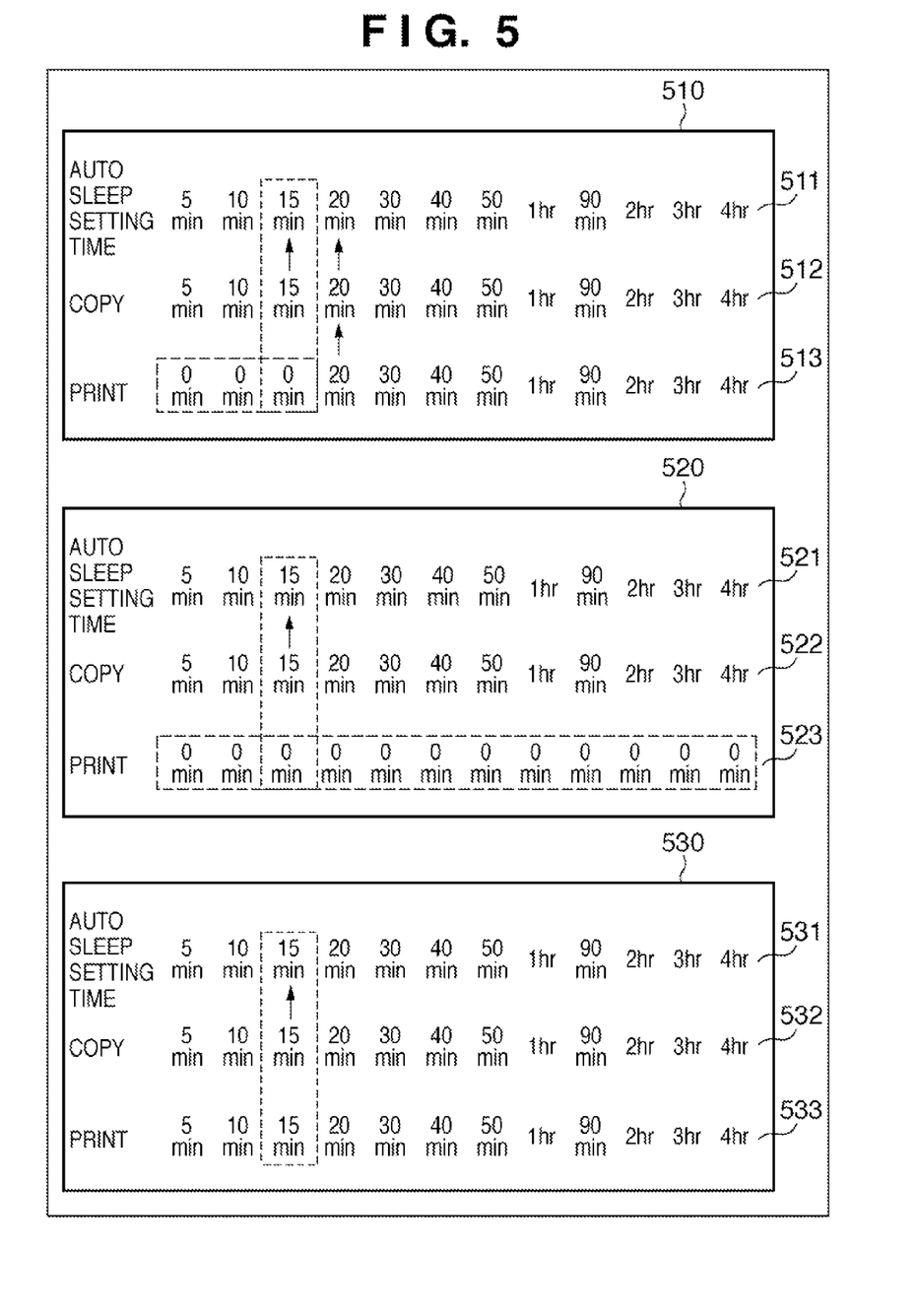
FIG. 5 is a view for explaining an auto sleep shift time for each function according to the first embodiment.

The relationship between setting times as auto sleep shift times and auto sleep shift times applied to the respective functions will be described next with reference to FIG. 5. Reference numeral 510 denotes a table showing auto sleep shift times for printing operation and copying operation described with reference to FIGS. 7 and 8; 511, setting times as auto sleep shift times set via the setting window 600; 512, actual auto sleep shift times in copying operation in comparison with the respective setting times; and 513, actual auto sleep shift times in printing operation in comparison with the respective setting times.

The auto sleep shift times for copy jobs are equal to the setting times as auto sleep shift times set via the setting window 600. In the case of print jobs, the sleep shift time is 0 min up to 15 min as a default value (initial value) of the image forming apparatus 100. When auto sleep shift times equal to or more than 20 min are set, the auto sleep shift times in print jobs become equal to the setting times.

That is, if a setting time as an auto sleep shift time is equal to or less than a preset initial value (15 min), the image forming apparatus 100 according to this embodiment shifts to the sleep state when the setting time elapses at the time of copying operation. When the job is complete in printing operation, the apparatus immediately shifts to the sleep state. If a setting time as an auto sleep shift time exceeds a preset initial value, the apparatus shifts to the sleep state when the setting time elapses at the time of copying operation and printing operation.

As described above, the image forming apparatus according to this embodiment determines the above shift time in accordance with a setting time as a shift time until a shift to the sleep mode and an executed function. More specifically, the image forming apparatus determines a setting time as a shift time when an executed function is the first function. When an executed function is the second function and a setting time exceeds the initial value, the image forming apparatus determines the setting time as a shift time. In addition, if an executed function is the second function and a setting time is equal to or less than the initial value, the image forming apparatus determines to provide no shift time. In this case, for example, the first function is the copying function and the second function is the printing function. This allows the image forming apparatus to execute sleep control for a shift to the sleep mode for each function. The image forming apparatus need not set the above setting time for each function, and hence can provide the operator with an operator-friendly operation system. For example, by setting a setting time exceeding the initial value, the operator can avoid the operation of entering the sleep mode immediately after printing processing. This can solve the problem of slow start-up. On the other hand, when the operator wants to reduce power consumption, he/she can perform control to enter the sleep mode immediately after printing processing by setting a setting time equal to or less than the initial value.

<Second Embodiment>

Figure 9:
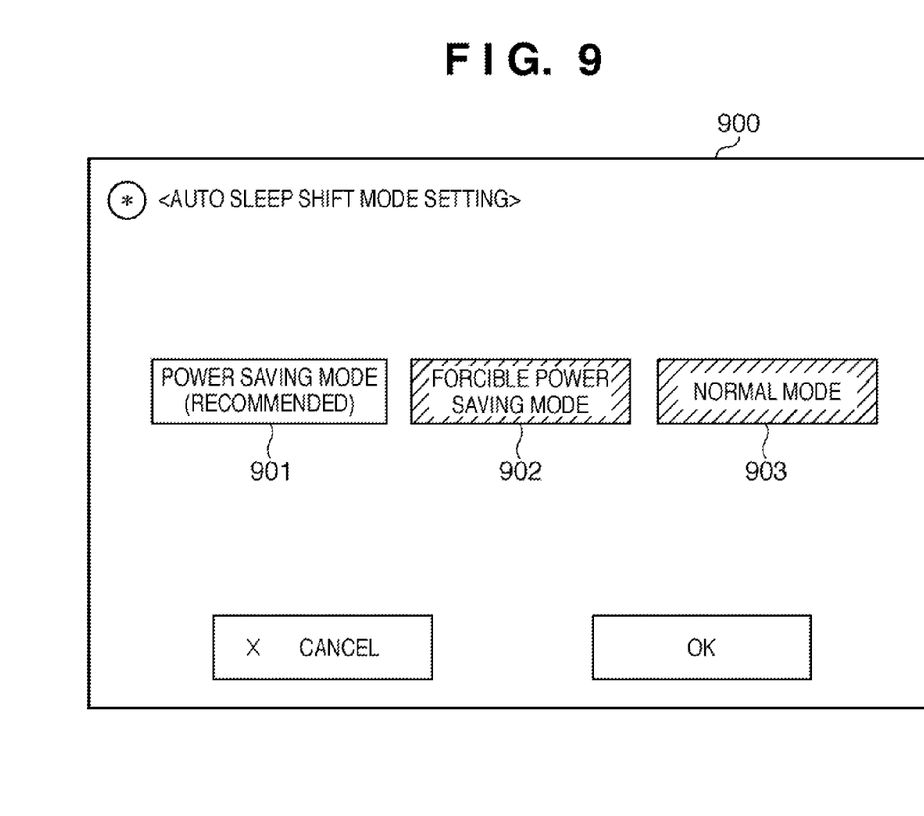
FIG. 9 is a view showing an example of a selection window 900 displayed on a display unit 202 according to the second embodiment.

The second embodiment will be described below with reference to FIGS. 5 and 9. This embodiment includes three types of shift modes in addition to the arrangement of the first embodiment. When the operator presses a setting key 203, a setting menu (not shown) appears. When the operator selects the setting of an auto sleep shift mode from the menu, a display unit 202 displays a shift mode selection window 900 shown in FIG. 9.

The selection window 900 is displayed so as to allow the operator to select one of auto sleep shift modes including a power saving mode 901, a forcible power saving mode 902, and a normal mode 903. The power saving mode 901 is selected in default setting. In the power saving mode 901, this apparatus performs sleep control as indicated by a table 510 in FIG. 5 in order to perform the same sleep control as that in the first embodiment. A detailed description of this mode is redundant to that in the first embodiment, and hence will be omitted.

A case in which the forcible power saving mode 902 is selected will be described next. In the forcible power saving mode 902, this apparatus performs sleep control as indicated by a table 520 in FIG. 5. Reference numeral 521 denotes setting times as auto sleep shift times set via a setting window 600; 522, actual auto sleep shift times in copying operation in comparison with the respective setting times; and 523, actual auto sleep shift times in printing operation in comparison with the respective setting times.

The auto sleep shift times for copy jobs are equal to the setting times as auto sleep shift times set via the setting window 600. In the case of print jobs, auto sleep shift times are always 0 min regardless of the setting times 521. That is, in the forcible power saving mode 902, the apparatus shifts to the sleep mode immediately after the end of printing processing. Therefore, the apparatus does not perform determination in step S703 in the flowchart of FIG. 7 at the time of printing operation in the forcible power saving mode 902. That is, the apparatus executes processing in steps S707, S708, and S706 following processing in step S702.

A case in which the normal mode 903 is selected will be described next. In the normal mode 903, sleep control is performed as indicated by a table 530 in FIG. 5. Reference numeral 531 denotes setting times as auto sleep shift times set via a setting window 600; 532, actual auto sleep shift times in copying operation in comparison with the respective setting times; and 533, actual auto sleep shift times in printing operation in comparison with the respective setting times.

The auto sleep shift times for copy jobs are equal to the setting times as auto sleep shift times set via the setting window 600. Likewise, the auto sleep shift times for print jobs are equal to the setting times.

As described above, this embodiment includes three types of shift modes, namely a power saving mode 901, a forcible power saving mode 902, and a normal mode 903, and switches sleep control operations in accordance with the selection made by the operator via a selection window 900.

As described above, the image forming apparatus according to this embodiment allows to select a determination method of determining a shift time (e.g., to select the power saving mode, the forcible power saving mode, or the normal mode), and determines a shift time in accordance with the selected selection method. In this case, the power saving mode is the shift time determination method described in the first embodiment. In the forcible power saving mode, when the first function (e.g., the copying function) is executed, a setting time is determined as a shift time, whereas when the second function (e.g., the printing function) is executed, no shift time is provided regardless of setting times. In the normal mode, a setting time is determined as a shift time regardless of the executed function. This makes it possible to perform sleep control more finely and satisfy more requirements of the operator.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-156327 filed on Jun. 30, 2009, which is hereby incorporated by reference herein in its entirety.

What is claimed is:

1. An image forming apparatus which operates in a first power state in which power is supplied to a part of the image forming apparatus and a second power state in which power is not supplied to the part of the image forming apparatus, comprising:
   a reception unit that receives image data transmitted from an external device;
   an acquisition unit that acquires image data by reading a document;
   an image forming unit that executes a printing function of forming an image based on image data received by the reception unit or a copying function of forming an image based on image data acquired from the acquisition unit; and
   a control unit configured to shift a power state of the image forming apparatus (i) to the second power state upon an elapse of a first time after forming the image by the copying function based on the acquired image data, and (ii) to the second power state upon an elapse of a second time, different from the first time, after forming the image by the printing function based on the received image data.

2. The apparatus according to claim 1, further comprising:
   a setting unit configured to set the first time.

3. The apparatus according to claim 1, wherein the second time is shorter than the first time.

4. The apparatus according to claim 1, further comprising:
   a setting unit configured to set the first time,
   wherein the control unit shifts the power state of the image forming apparatus to the second power state upon the elapse of the second time after forming the image by the printing function based on the received image data in a case where the first time set by the setting unit is shorter than predetermined time, and
   the control unit shifts the power state of the image forming apparatus to the second power state upon the elapse of the first time after forming the image by the printing function based on the received image data in a case where the first time set by the setting unit is not shorter than predetermined time.

5. The apparatus according to claim 1, further comprising:
   a selection unit configured to select a control mode of the control unit,
   wherein the control unit shifts the power state of the image forming apparatus to the second power state upon the elapse of the second time after forming the image by the printing function based on the received image data in a case where the selection unit selects a first mode, and
   the control unit shifts the power state of the image forming apparatus to the second power state upon the elapse of the first time after forming the image by the printing function based on the received image data in a case where the selection unit selects a second mode.

6. A method for controlling an image forming apparatus which operates in a first power state in which power is supplied to a part of the image forming apparatus and a second power state in which power is not supplied to the part of the image forming apparatus, the method comprising:
   receiving image data transmitted from an external device;
   acquiring image data by reading a document;
   executing a printing function of forming an image based on image data received by the reception unit or a copying function of forming an image based on image data acquired from the acquisition unit; and
   shifting a power state of the image forming apparatus to the second power state upon (i) an elapse of a first time after forming the image by the copying function based on the acquired image data, and (ii) an elapse of a second time different from the first time after forming the image by the printing function based on the received image data.

* * * * *